(12) United States Patent
Shelton et al.

(10) Patent No.: US 8,130,195 B2
(45) Date of Patent: Mar. 6, 2012

(54) CLONING HAND DRAWN IMAGES

(75) Inventors: Michael James Shelton, Boise, ID (US);
Willam Robert Cridland, Boise, ID
(US); Jerry Shelton, Meridian, ID (US);
Steven Harold Taylor, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 824 days.

(21) Appl. No.: 12/245,284

(22) Filed: Oct. 3, 2008

(65) Prior Publication Data
US 2009/0043913 A1    Feb. 12, 2009

Related U.S. Application Data

(63) Continuation-in-part of application No. 11/891,349, filed on Aug. 10, 2007, now Pat. No. 7,929,002.

(60) Provisional application No. 61/035,229, filed on Mar. 10, 2008.

(51) Int. Cl.
*G06F 3/033* (2006.01)
*G09G 5/08* (2006.01)

(52) U.S. Cl. .......................... 345/157; 345/158; 345/183

(58) Field of Classification Search .................. 345/157, 345/158, 183
See application file for complete search history.

(56) References Cited

U.S. PATENT DOCUMENTS

| 5,448,263 | A | 9/1995 | Martin | |
|---|---|---|---|---|
| 5,914,783 | A * | 6/1999 | Barrus | 345/179 |
| 6,141,000 | A | 10/2000 | Martin | |
| 6,337,681 | B1 | 1/2002 | Martin | |
| 6,512,507 | B1 * | 1/2003 | Furihata et al. | 345/158 |
| 6,747,636 | B2 | 6/2004 | Martin | |
| 6,809,843 | B1 | 10/2004 | Youngers | |
| 6,999,061 | B2 | 2/2006 | Hara et al. | |
| 7,986,302 | B2 * | 7/2011 | Horikiri | 345/157 |
| 2008/0024443 | A1 * | 1/2008 | Horikiri | 345/157 |

\* cited by examiner

*Primary Examiner* — Kevin M Nguyen
(74) *Attorney, Agent, or Firm* — Jack H. McKinney

(57) ABSTRACT

A method for cloning hand drawn images includes identifying, within an environment, a position of a wand with respect to each of a first plurality of user selected physical points. A virtual plane identified by the first plurality of points is defined. The virtual plane corresponds to a first marking surface. An electronic page is associated with the first virtual plane. A motion of the wand is tracked. The motion corresponds to a use of the wand to draw a first mark on the first marking surface. A path traced across the first virtual plane is identified. The path is defined by the tracked motion. The electronic page is updated to include a digital image representative of the path. The digital image is a clone of the mark.

21 Claims, 15 Drawing Sheets

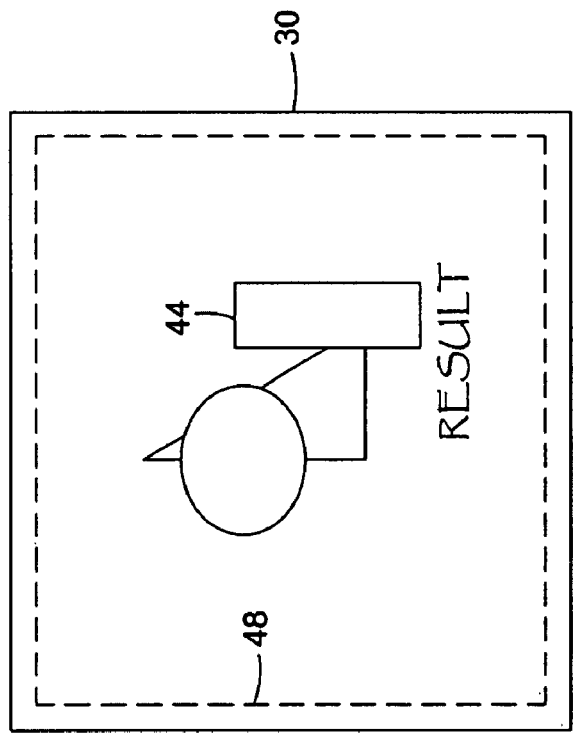
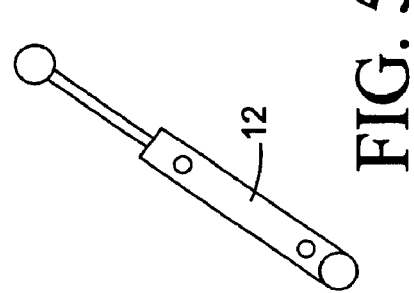
FIG. 4
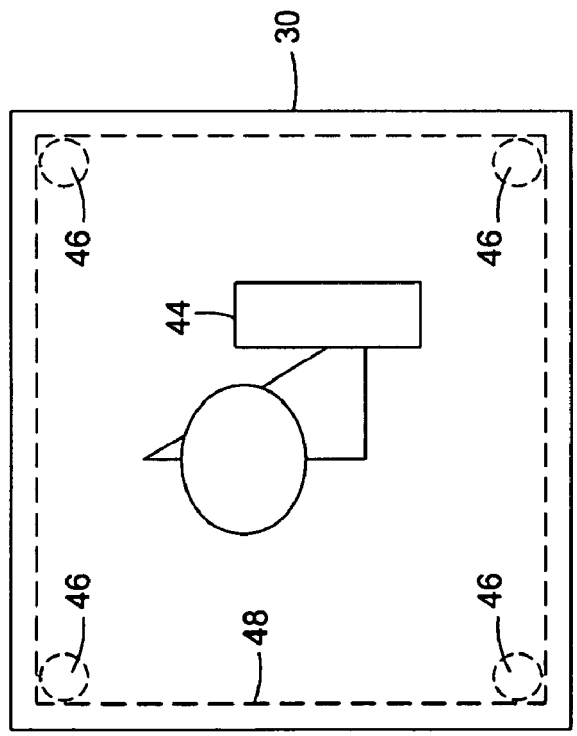
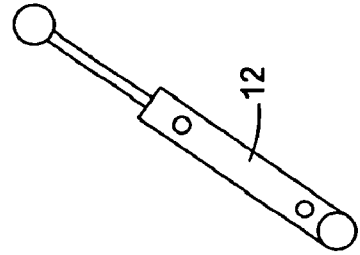
FIG. 5

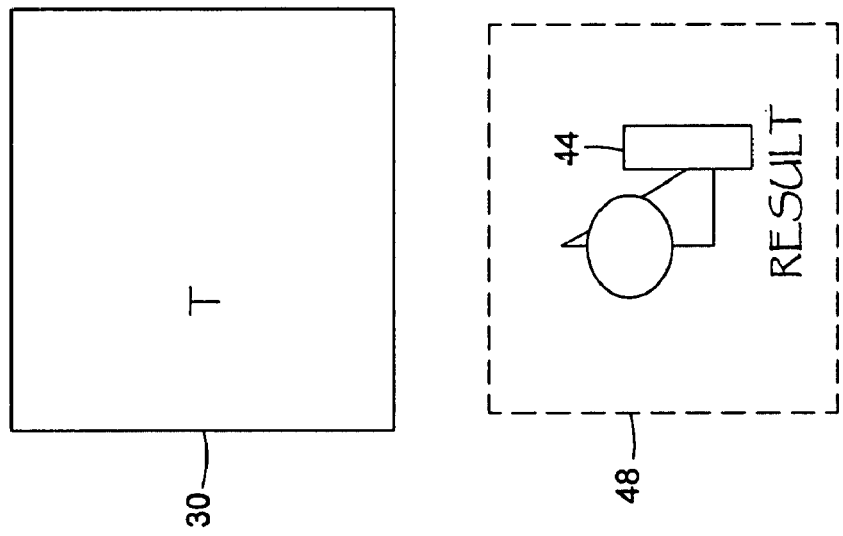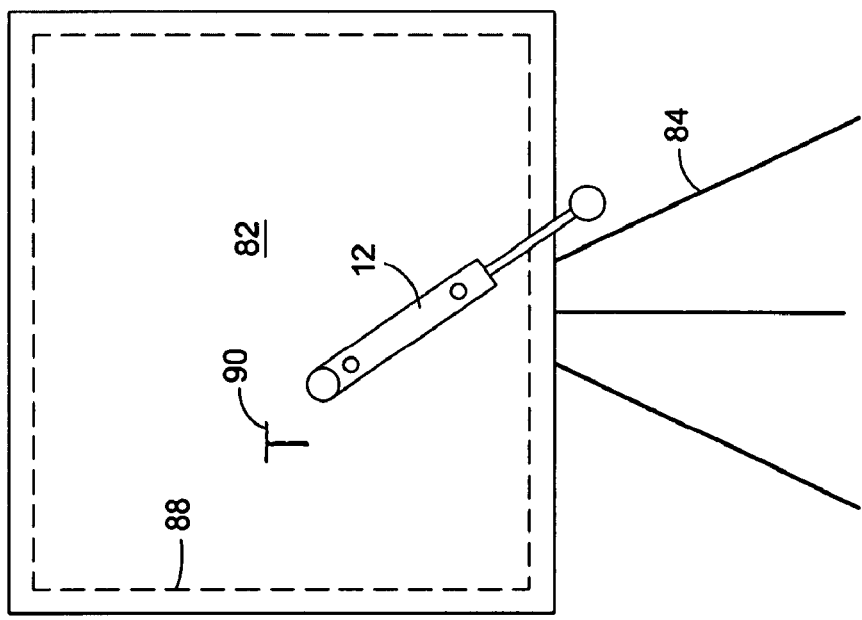
FIG. 11

CLONING HAND DRAWN IMAGES

CROSS REFERENCE TO RELATED APPLICATIONS

This application claims the benefit of provisional patent application Ser. No. 61/035,229, filed Mar. 10, 2008, entitled "CLONING HAND DRAWN IMAGES" which application is incorporated by reference herein as if reproduced in full below.

This application is a continuation in part of U.S. application Ser. No. 11/891,349 filed Aug. 10, 2007 now U.S. Pat. No. 7,929,002 entitled "System and Method of Projecting an Image on a Physical Substrate using a Virtual Image and a Virtual Plane." The '349 application is incorporated herein by reference in its entirety.

BACKGROUND

Consumers, particularly those in business, education and government arenas, benefit from collaborating with colleagues and others from locations remote from one another. There are numerous options available to facilitate such communications. Examples include telephones, fax machines, and e-mail among others. There are, however, few options available that enable those at geographically disparate locations to collaborate with each other on group projects, joint tasks and the like. Such is particularly true with respect to hand drawn images. For example, it may be desirable for a presenter at one location to jot notes and figures on a dry erase board or flip chart. Unfortunately, collaborators at remote locations are not able to view the presenter's hand drawn images.

DRAWINGS

FIG. 4 is a schematic diagram illustrating a virtual plane that corresponds to a display surface according to an embodiment.

FIG. 5 is a schematic diagram illustrating text on the display surface, the display of the text resulting from a motion of the wand with respect to the virtual plane according to an embodiment.

FIGS. 11 and 12 are schematic diagrams illustrating text being written on the physical marking surface using the wand according to an embodiment. FIG. 11 also illustrates the cloning of the text resulting from the motion of the wand with respect to the virtual plane.

FIG. 14 also illustrates the cloning of the text and graphic on the display resulting from the motion of the wand with respect to the virtual plane corresponding to the non-relocated physical marking surface.

FIG. 15 also illustrates the cloning of the text and graphics on the display resulting from the motion of the wand with respect to the relocated virtual plane.

DETAILED DESCRIPTION

Introduction: Various embodiments described below allow a presenter, using a specialized wand, described below, to draw physical markings on a surface such as a dry erase board or flip chart. The motion of the wand is tracked with respect to the surface allowing the physical markings to be cloned and displayed to remote viewers. Beneficially, the presenter can identify any marking surface within a given location and have the motion of the wand tracked with respect to that marking surface. In this manner, the presenter can identify and use multiple marking surfaces and reposition previously identified marking within that location. Digital clones of the presenter's markings can then be saved like electronic pages or slides, one for each marking surface. Once saved, each electronic page or slide can be recalled, displayed, and updated.

Figure 1:
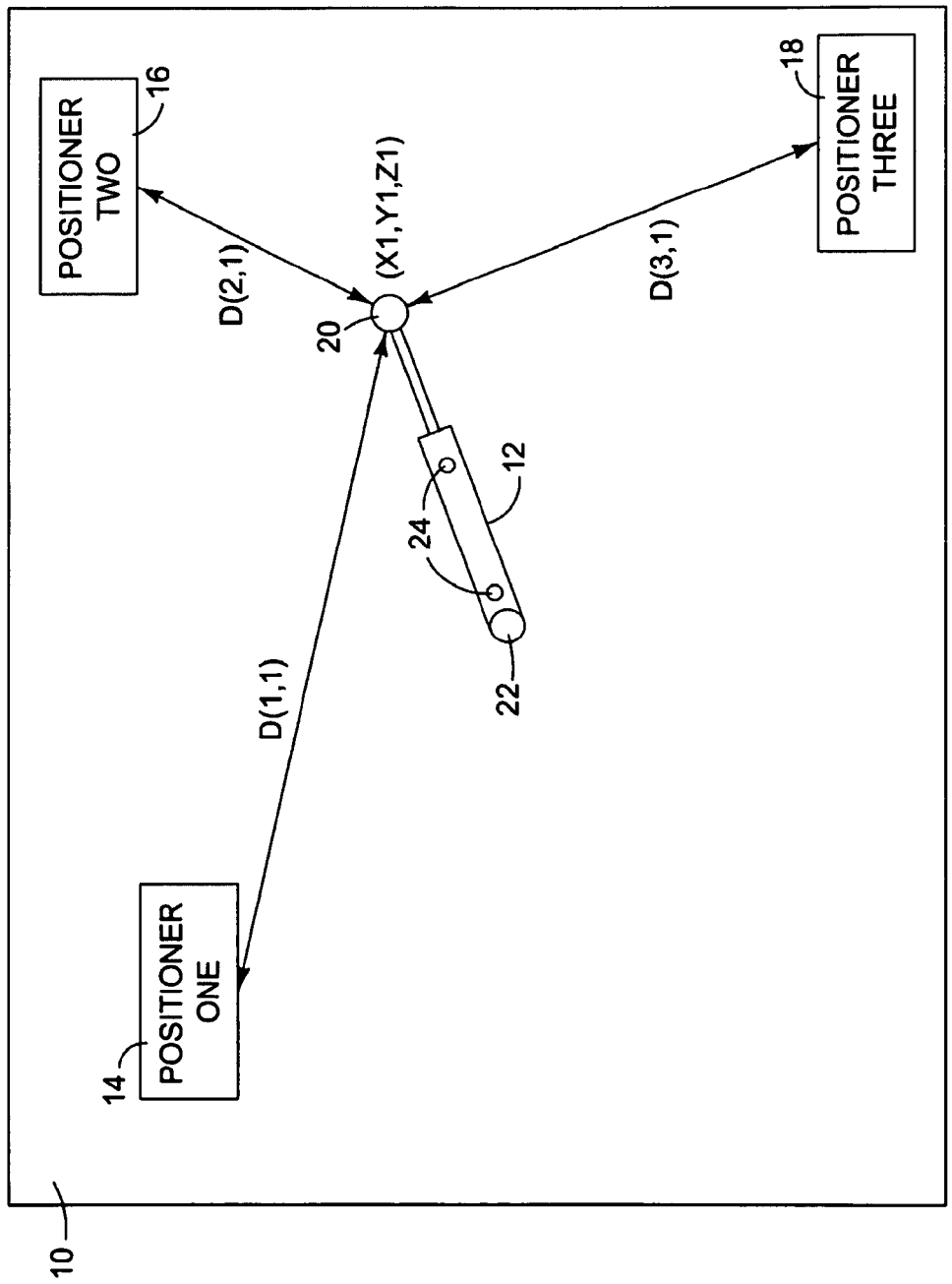
FIGS. 1 and 2 illustrate an exemplary environment in which the relative position and orientation of a wand can be identified according to an embodiment.
Figure 2:
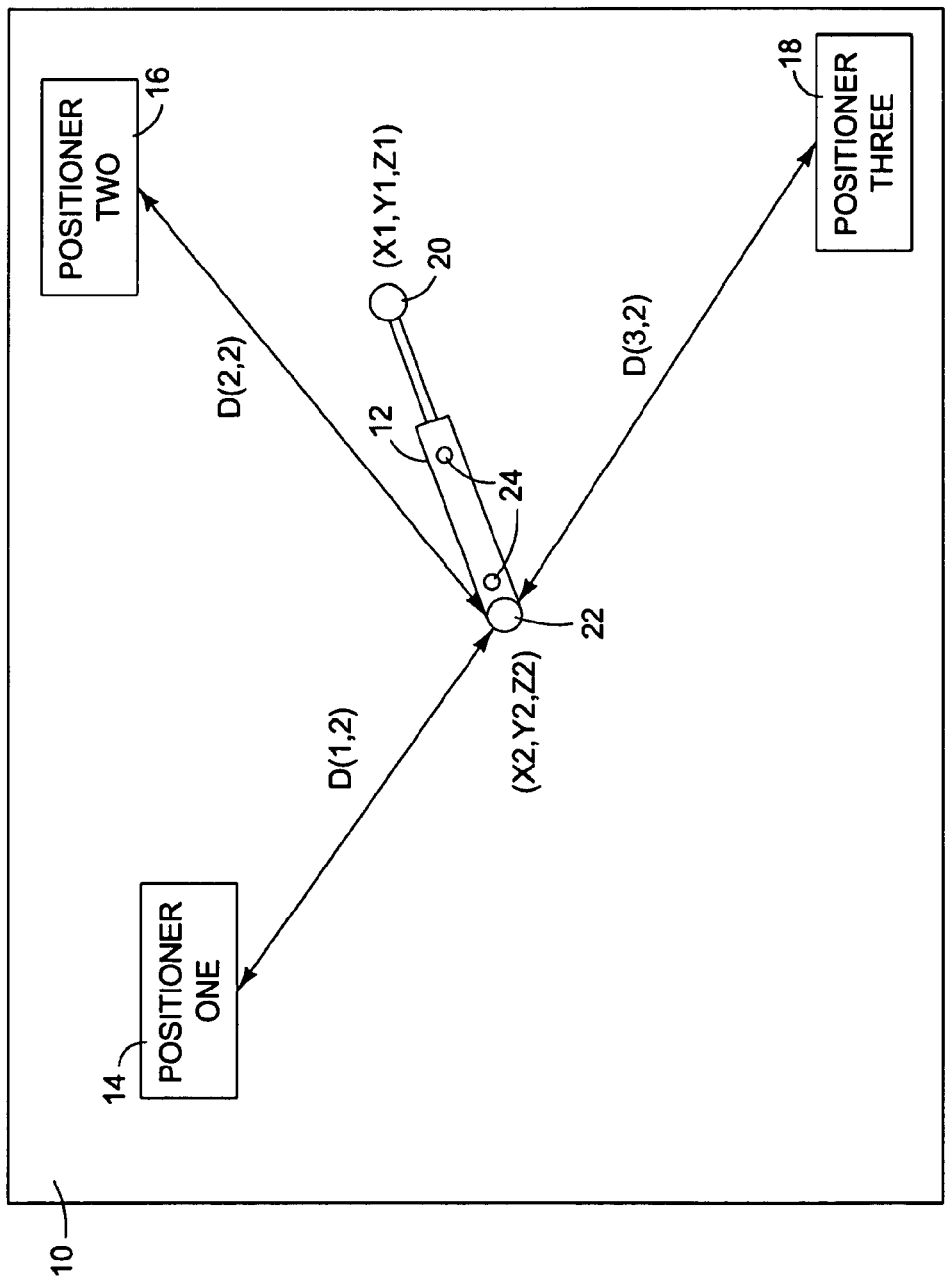

Environment: FIGS. 1 and 2 are an exemplary view of a presentation environment 10 in which various embodiments may be implemented. Environment 10 represents generally any space in which a user may desire to mark physical images on a surface and have those physical marks be cloned and represented to remote viewers. Environment 10 may, for example, be a building, a room within a building, an outdoor space like a park, backyard, or field.

In the examples of FIGS. 1 and 2, environment 10 includes wand 12 and positioners 14, 16, and 18. Wand 12 represents generally a hand-held device that can be moved like a pen or other physical marking device within environment 10. The term wand is used not to convey any particular structure other than a structure that is capable of being held in the hand of a user.

Positioners 14, 16, and 18 represent wireless communication devices placed at defined locations within environment 10. Positioners 14, 16, 18 are configured to use trilateration or other positioning techniques to identify relative positions of compatible transmitters within environment 10. Where, for example, environment 10 is a building or room, two of positioners 14, 16, and 18 may be positioned in approximately the bottom corners of one side of the building or room and a third one of positioners 14, 16, and 18 may be positioned on the opposite side near the top of the building or room. Positioners 14, 16, and 18 can be attached to a communication network within environment 10, and can be assigned a network address so that they can communicate with each other and with other electronic devices such as a computer on the network.

Wand 12 is shown to include a plurality of transmitters 20 and 22 compatible with positioners 14, 16, and 18. Each of transmitters 20 and 22 is configured to transmit a signal that can be received and interpreted using trilateration or other positioning techniques allowing positioners 14, 16, and 18 to be used to identify the relative position of each transmitter 20 and 22 within environment 10. With wand 12 including at least two transmitters 20 and 22 positioned at opposite ends, the position and orientation of wand 12 within environment 10 can be identified and tracked.

Referring to FIG. 1, positioner 14 has received a signal from transmitter 20, interpreted that signal, and determined that transmitter 20 is located a distance D(1,1) from positioner 14. Likewise it has been determined that transmitter 20 is positioned a distance D(2,1) from positioner 16 and a distance D(3,1) from positioner 18. Assuming the relative positions of positioners 14, 16, and 18 within environment 10 are known, the distances D(1,1), D(2,1), and D(3,1) can, using trilateration techniques, be used to identify the relative coordinates (X1,Y1,Z1) of transmitter 20 within environment 10.

Referring to FIG. 2, positioner 14 has received a signal from transmitter 22, interpreted that signal, and determined that transmitter 22 is located a distance D(1,2) from positioner 14. Likewise it has been determined that transmitter 22 is positioned a distance D(2,2) from positioner 16 and a distance D(3,2) from positioner 18. Again, assuming the relative positions of positioners 14, 16, and 18 within environment 10 are known, the distances D(1,2), D(2,2), and D(3,2) can be used to identify the relative coordinates (X2,Y2,Z2) of transmitter 22 within environment 10. The two identified sets of coordinates, (X1,Y1,Z1) and (X2,Y2,Z2), define a line segment that represents the orientation of wand 12 within environment 10.

Wand 12 is also shown to include controls 24. Controls 24 represent generally any user activated control for initiating an action with respect to wand 12. For example, one of the controls may be a push button that when depressed causes the current position and orientation of wand 12 to be recorded. As will be discussed below, wand 12 may be equipped for use as a physical marking device. Another control 24 may be a scroll wheel that can be used to identify a color of the marking device.

Figure 3:
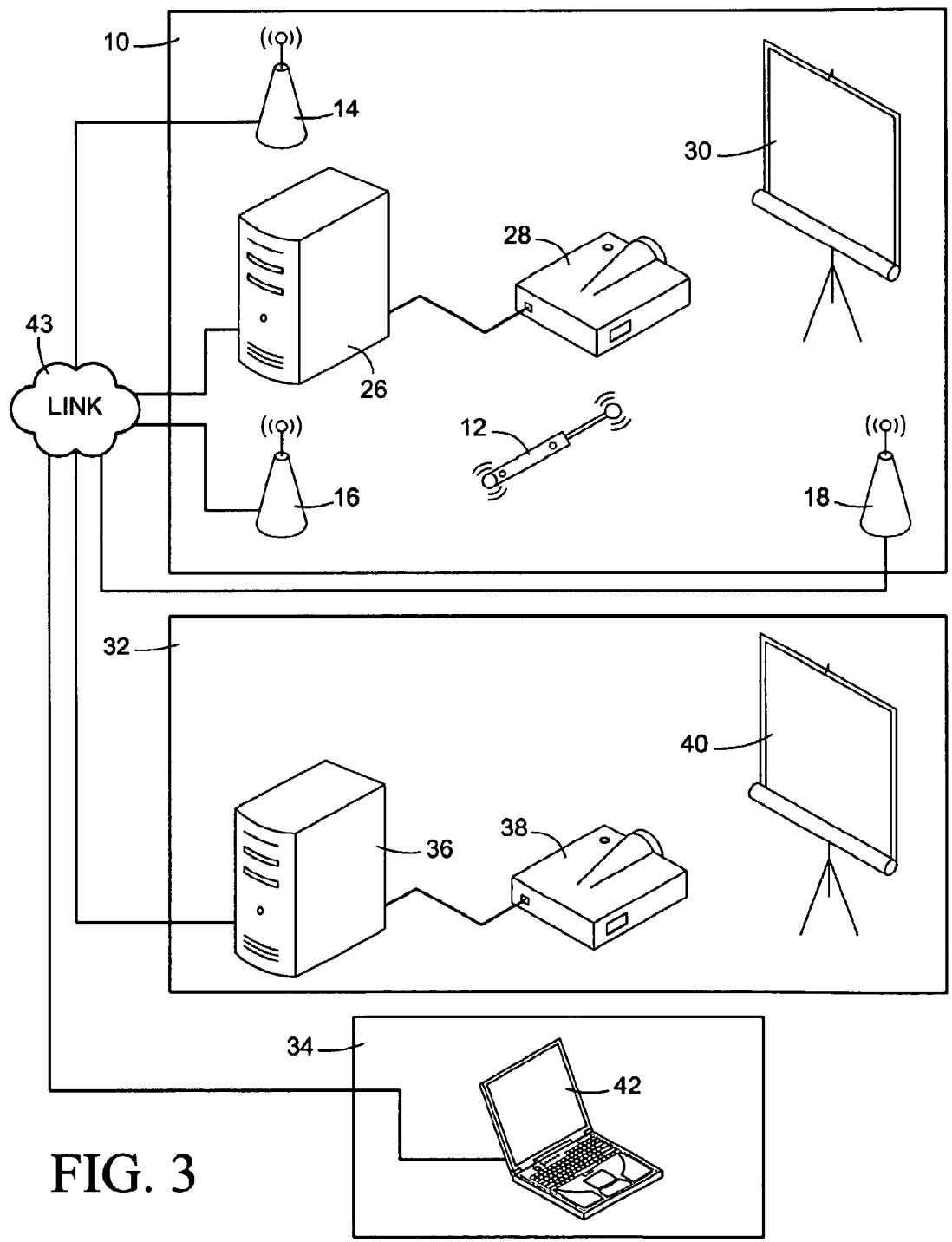
FIG. 3 is a block diagram illustrating the environment of FIG. 1 placed in network communication with remote environments according to an embodiment.

FIG. 3 is a block diagram illustrating local presentation environment 10 and remote presentation environments 32 and 34. In addition to wand 12 and positioners 14, 16, and 18, environment 10 is shown to include computer 26, projector 28, and screen 30. Discussed in more detail below with respect to FIG. 16, computer 26 represents generally any computing device capable of executing one or more programs for communicating with positioners 14, 16, and 18 to track the position and orientation of wand 12. Computer 26 is also responsible for executing one or more programs for causing the projector to project images corresponding to changes in the tracked position and orientation of wand 12.

As noted above, FIG. 3 also illustrates remote presentation environments 32 and 34. Remote presentation environments 32 and 34 represent generally any presentation environment that is geographically remote from local presentation environment 10. Remote presentation environment 32 is shown to include computer 36, projector 38 and screen 40. Remote presentation environment 34 is shown to include computer 42.

Link 43 interconnects, at least indirectly, positioners 14, 16, and 18, computer 26, computer 36, and computer 42. Link 43 represents generally one or more of a cable, wireless, or remote connection via a telecommunication link, an infrared link, a radio frequency link, or any other connector or system of connectors that provides electronic communication between positioners 14, 16, and 18, computer 26, computer 36, and computer 44. It is noted that link 43 can represent both a LAN (Local Area Network) and a WAN (Wide Area Network). The interconnections between positioners 14, 16, and 18 and computer 26 may be a LAN for local presentation environment 10. The interconnections between computers 26, 36, and 42 may be a WAN interconnecting local and remote presentation environments 10, 32, and 34.

When computer 26 causes projector 28 to display images on screen 30, computer 26 also shares those images over link 43 with computers 36 and 42. Computer 36 can then cause projector 38 to project those images on screen 40. Computer 42 can simply display the images. In this manner, users present at remote presentation environments 32 and 34 can view a presentation as if they were present in local presentation environment 10.

Drawing on a Virtual Plane: FIG. 4 is a schematic diagram illustrating a virtual plane that corresponds to projection to a display surface, in this case projection screen 30 of FIG. 3. FIG. 5 is a schematic diagram illustrating text displayed on projection screen 30. The text displayed resulted from a motion of the wand with respect to the virtual plane.

FIG. 4 shows an image 44 being displayed on projection screen 30. FIG. 4 also shows a virtual plane 48 positioned relative to projection screen 30. Virtual plane 48 represents an imaginary plane whose position is defined relative to positioners 14, 16, and 18 within local presentation environment 10. To define virtual plane 48, a user sequentially positions wand 12 and presses a particular control 24 (FIGS. 1 and 2) at two or more corners 46 of projection screen 30 causing positioners 14, 16, and 18 and computer 26 to identify the relative coordinates of the identified corners within the local presentation environment. Assuming virtual plane 48 is rectilinear, vertically oriented, and the coordinates for two corners 46 diagonal from one another are identified, those two coordinates can be used to identify the other two coordinates of the other two corners 46. However, where the orientation of virtual plane cannot be presumed to have a vertical or any other particular orientation, the coordinates for at least three corners 46 are used to define virtual plane 48. For example, a given virtual plane could represent a table top instead of a projection screen or other surface typically having a vertical orientation.

With virtual plane 48 defined, the position and orientation of wand 12 can be tracked. As discussed above with respect to FIG. 2, positioners 14, 16, and 18 can be used to identify a line segment wand 12 occupies in local presentation environment 10. The orientation of wand 12 with respect to the virtual plane 48 can be discerned from the line segment. Extending the line segment through presentation environment 10, a point at which the resulting line intersects virtual plane 48 can be identified. As the orientation of wand 12 changes, the point of intersection moves tracing a path across the virtual plane 48. This path can be tracked and cloned as a digital image representative of the motion of wand 12 with respect to virtual plane 48. That digital image can then be displayed on projection screen 30. To track the path, the coordinates of the point of intersection can be repeatedly recorded over time. The traced path is represented by a series of line segments sequentially connecting the coordinates.

FIG. 5 illustrates an example in which a user has moved wand 12 to mimic the drawing of text, in this case, the word "RESULT." The motion of wand 12 with respect to each stroke of each letter and the corresponding path traced across virtual plane 48 are identified as the user alternately presses and releases a particular control 24 on wand 12 (FIGS. 1 and 2). An electronic page or slide can be associated with virtual plane 48. That page is repeatedly updated to include a digital image for each path traced across virtual plane 48. The resulting page then includes a digital image of the word "RESULT." That electronic page is then displayed as an overlay on image 44. The term electronic page, as used herein, refers to a digital object that can be displayed—not unlike a page of a word processing document or a slide in an electronic presentation. A new electronic page is typically blank but can be updated with graphics such as the word "Result". Electronic pages may be stored individually or in a combined electronic file.

Wands: The examples of FIGS. 4 and 5 illustrate the use of wand 12 to generate a digital image that can be displayed on a screen. With wand 12 pointed at virtual plane 48 and, in this case, projection screen 30, the user waves wand 12 in a manner representative of a desired image. Often, however, the user may also desire to physically draw on a marking surface such as a dry erase board or flip chart. FIGS. 6-9 illustrate examples of wands 12' and 12" configured to be used with a physical marking device such as a dry erase or other type of marker.

Figure 6:
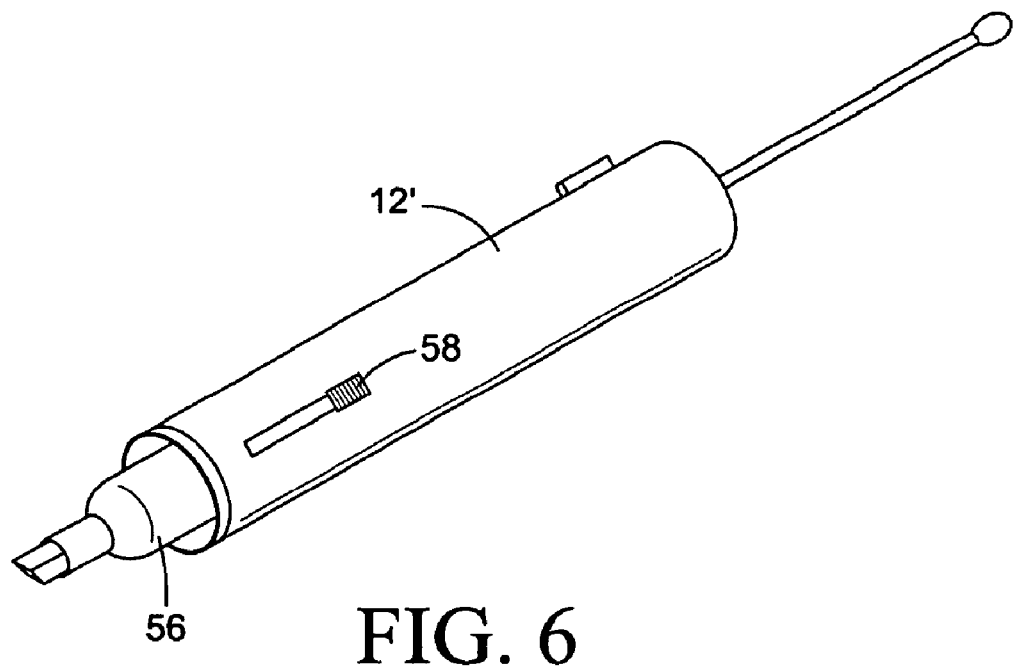
FIGS. 6 and 7 illustrate an exemplary wand in which a physical marking device can be inserted according to an embodiment.
Figure 7:
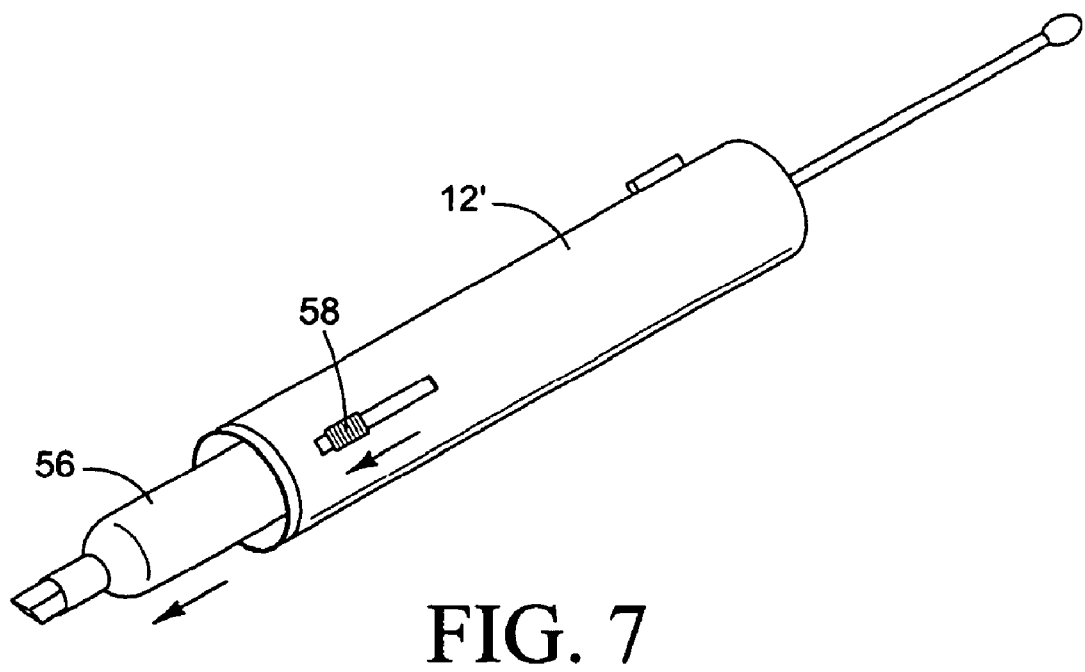
Figure 8:
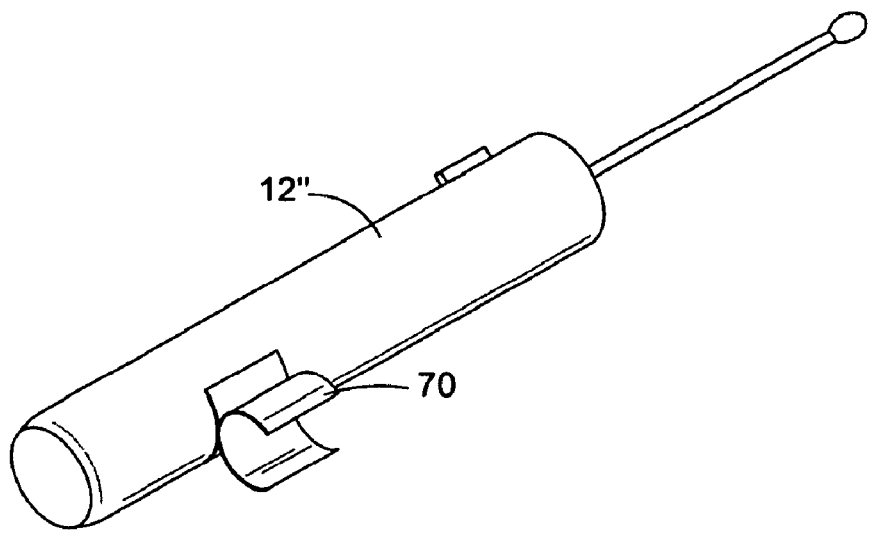
FIGS. 8 and 9 illustrate an exemplary wand in which a physical marking device can be attached according to an embodiment.
Figure 9:
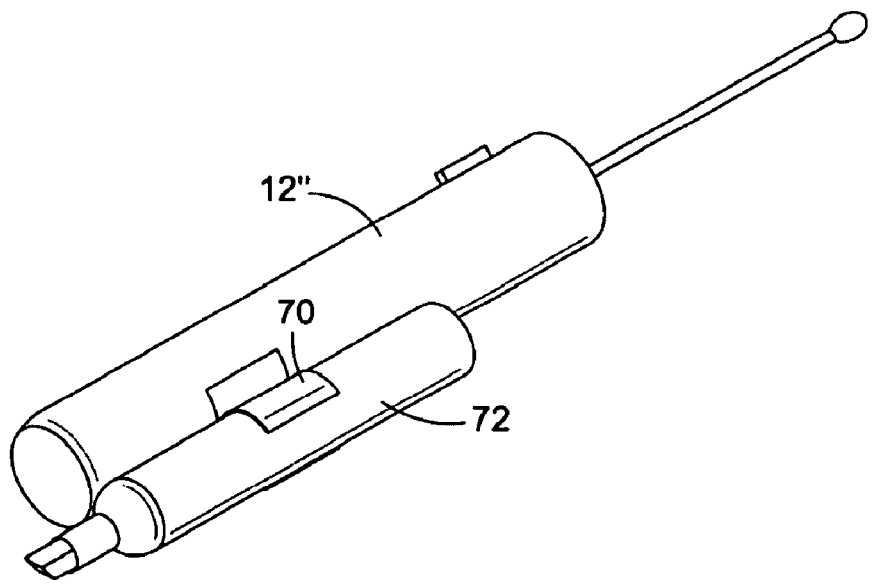

Starting with FIGS. 6 and 7, wand 12' is configured to utilize physical marker 56. In this example, marker 56 is insertable into wand 12. Wand 12 includes slider control 58 that when slid from the position shown in FIG. 6 to the position shown in FIG. 7 causes marker 56 to be ejected from wand 12.' Moving to FIGS. 8 and 9, wand 12" includes clip 70 which is configured to hold physical marker 72. In both examples, wands 12' and 12" can be used with a marker selected by a user. A selected marker can be removed and replaced with another. For example, a first user of wand 12' or 12" may desire to draw in red and a second user may desire to draw in black or blue.

Wands 12' and 12" will be referred to generically as wand 12. As discussed above with respect to FIGS. 1 and 2, wand 12 includes at least two transmitters spaced apart longitudinally. One of the transmitters is closer to the marking tip of the physical marker coupled to wand 12. In this manner, once the orientation of wand 12 is identified, it can be further discerned whether or not the tip of the physical marker is being pointed at or away from a virtual plane. Where the virtual plane is associated with a physical marking surface such as a dry erase board, the motion of wand 12 with respect to that virtual plane may be tracked only when it is determined that the marking tip is being pointed at the virtual plane. Where another virtual plane is associated with a projection screen, the motion of wand 12 with respect to the other virtual plane may be tracked only when it is determined that the marking tip is being pointed away from the other virtual plane.

Figure 10:
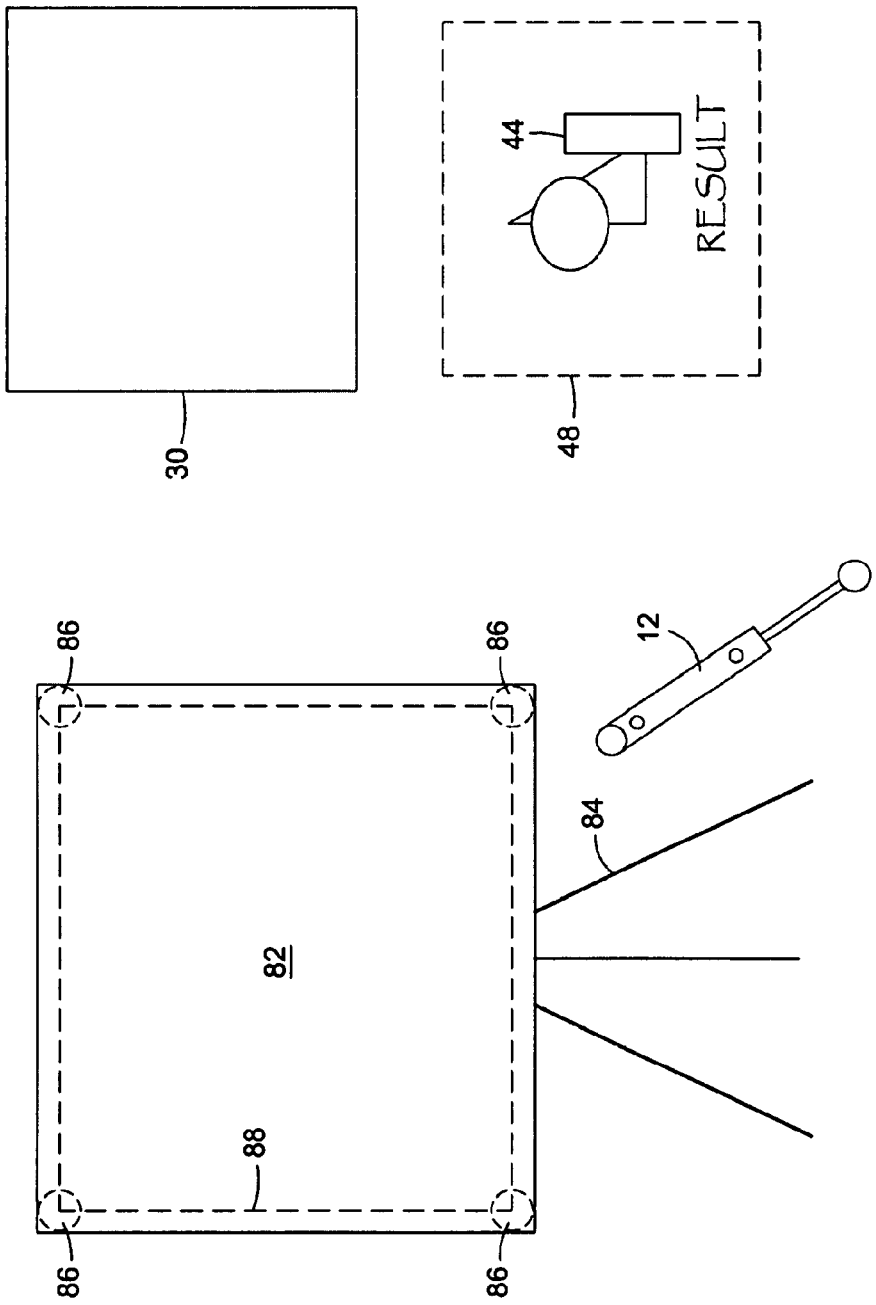
FIG. 10 is a schematic diagram illustrating a virtual plane that corresponds to a physical marking surface according to an embodiment.

Multiple Virtual Planes: FIG. 10 illustrates an example in which multiple virtual planes are defined. In particular, FIG. 10 shows virtual plane 48 from FIGS. 4 and 5 along with virtual plane 88 that corresponds to physical marking surface 82. Physical marking surface 82 represents a flip chart placed on easel 84. Virtual plane 88 represents an imaginary plane whose position is defined relative to positioners 14, 16, and 18 within local presentation environment 10. To define virtual plane 88, a user sequentially positions the wand 12 and presses a particular control 24 (FIGS. 1 and 2) at two or more corners 86 of physical marking surface 82 causing positioners 14, 16, and 18 and computer 26 to identify the relative coordinates of the identified corners within the local presentation environment. Assuming virtual plane 88 is rectilinear, vertically oriented, and the coordinates for two corners 86 diagonal from one another are identified, those two coordinates can be used to identify the other two coordinates of the other two corners 86.

In the Example of FIG. 10, computer 26 is managing two virtual planes, virtual plane 48 and virtual plane 88. As discussed above, a different electronic page is associated with each virtual plane 48 and 88. A virtual plane can be active or inactive. When active, the digital images, if any, included in the electronic page associated with the active virtual plane may be displayed on a display screen. In FIG. 10, virtual plane 88 has been set to active. Because virtual plane 88 is new, the electronic page associated with virtual plane 88 is blank containing no digital images. As such, no digital images are displayed on display screen 30. Nonetheless, the electronic page associated with virtual plane 48 can be saved for later use when virtual plane 48 is set to active. In one example, a virtual plane 48 or 88 can be set to active by pressing a particular control 24 (FIGS. 1 and 2) and pointing wand 12 at the virtual plane 48 or 88.

Figure 12:
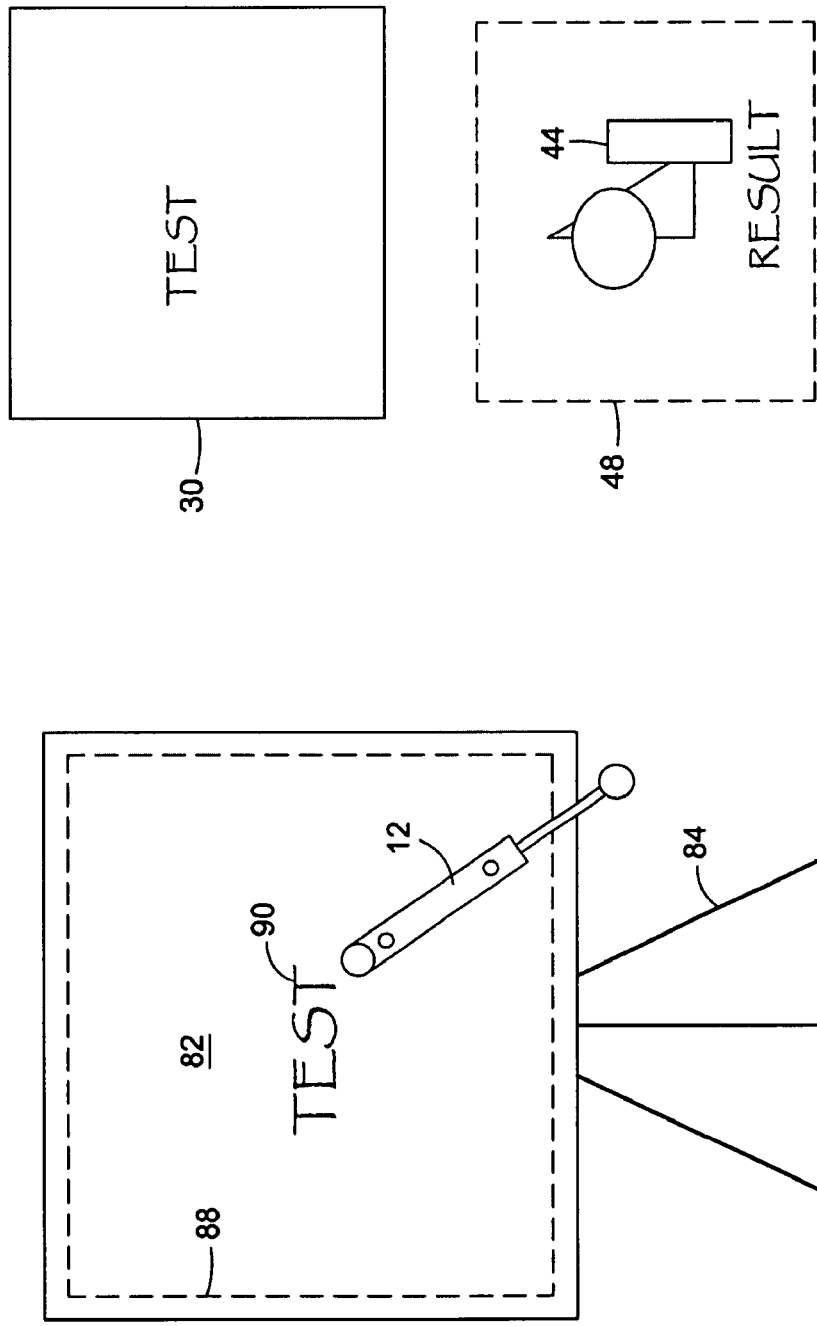

Cloning Hand Drawn Images: FIGS. 11 and 12 are schematic diagrams illustrating text being written on marking surface 82 using wand 12. FIGS. 11 and 12 also illustrate the cloning of the text resulting from the motion of the wand 12 with respect to virtual plane 88. In FIG. 11, with virtual plane 88 defined, the position and orientation of wand 12 can be tracked. As discussed above with respect to FIG. 2, positioners 14, 16, and 18 can be used to identify a line segment wand 12 occupies in local presentation environment 10. The orientation of wand 12 with respect to the virtual plane 48 can be discerned from the line segment. Extending the line segment through presentation environment 10, a point at which the resulting line intersects virtual plane 88 can be identified.

As wand 12 is used to mark physical marking surface 82, the orientation of wand 12 changes and the point of intersection moves tracing a path across virtual plane 88. This path can be tracked and cloned as a digital image representative of the marking on physical marking surface 82. That digital image can then be displayed on projection screen 30. In the Example of FIGS. 11 and 12, wand 12 is used to mark the word "TEST" 90 on physical marking surface 82. The motion of wand 12 is tracked to generate a digital image representative of the physical mark 90. The electronic page associated with virtual plane 88 is updated to include that digital image and is displayed on to projection screen 30.

Figure 13:
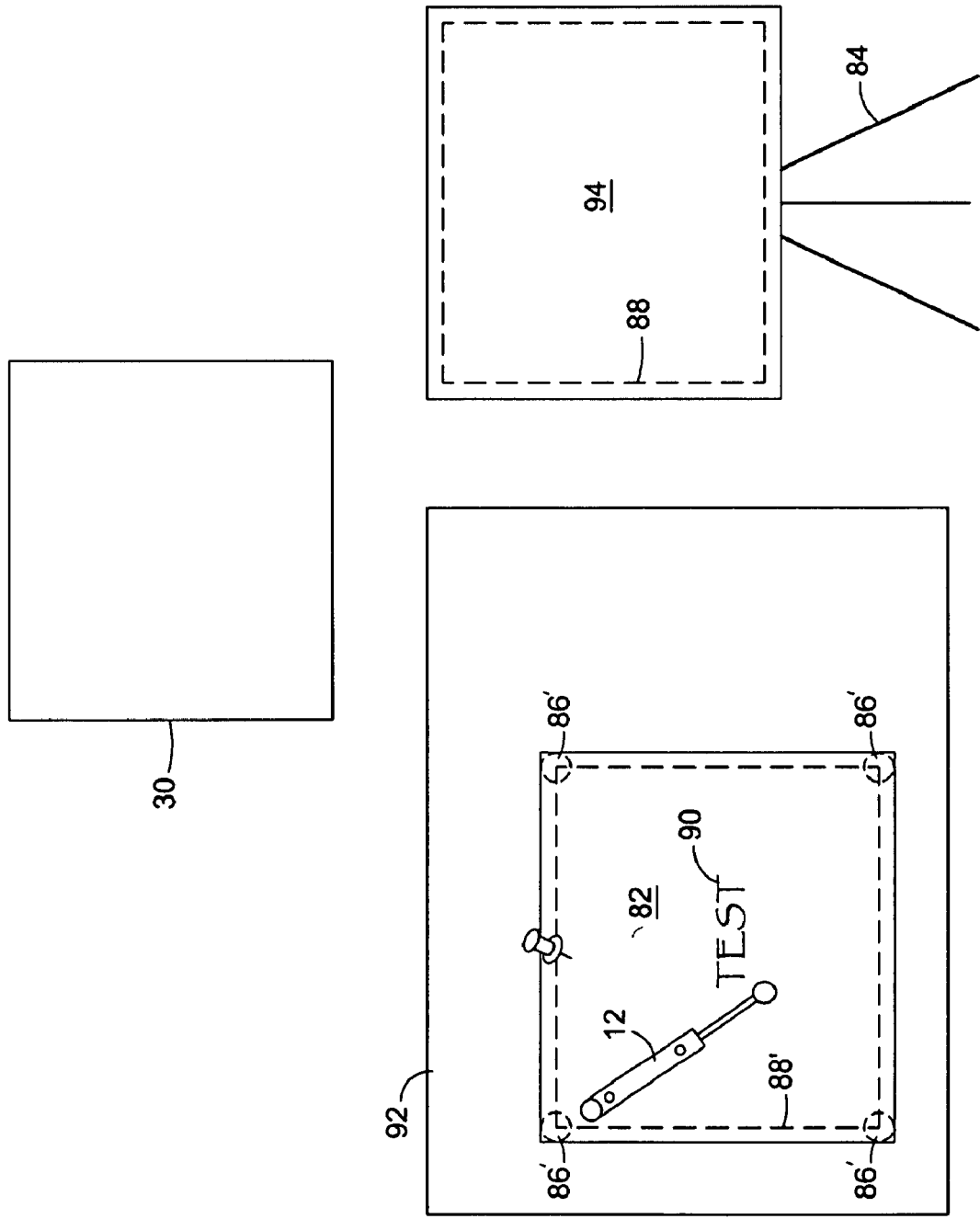
FIG. 13 is a schematic diagram illustrating the clearing of the display and the defining of a relocated virtual plane according to an embodiment.

Relocated Virtual Plane: Referring now to FIG. 13, where physical marking surface 82 is a page of a flip chart, the user may desire to tear off that page and pin it to bulletin board 92 or other surface for later use. When doing so, the electronic page associated with virtual plane 88 is saved and a new, blank electronic page is associated with virtual plane 88. Virtual plane 88 is still active and now corresponds to physical marking surface 94—a subsequent page in a flip chart placed on easel 84. Because the new electronic page is blank, no images are displayed on projection screen 30.

To define relocated virtual plane 88', a user sequentially positions wand 12 and presses a particular control 24 (FIGS. 1 and 2) at two or more corners 86' of physical marking surface 82 causing positioners 14, 16, and 18 and computer 26 to identify the relative coordinates of the identified corners within the local presentation environment. Assuming virtual plane 88' is rectilinear, vertically oriented, and the coordinates for two corners 86' diagonal from one another are identified, those two coordinates can be used to identify the other two coordinates of the other two corners 86'. Once relocated virtual plane 88' is defined, it is associated with the saved electronic page containing the digital image representative of physical mark 90, so when relocated virtual plane 88' is set to active, that electronic page can be displayed.

Figure 14:
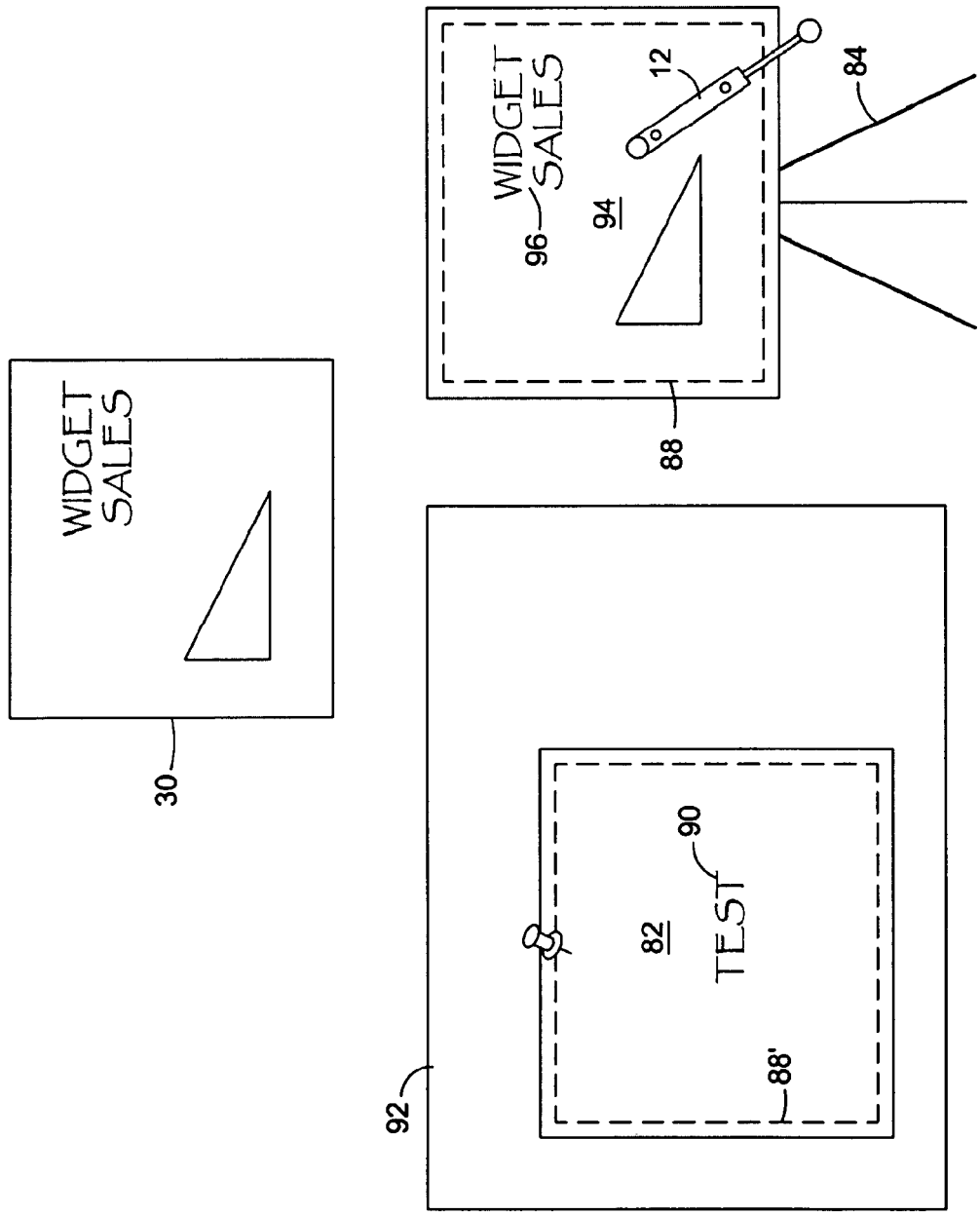
FIG. 14 is a schematic diagram illustrating text and a graphic being written on the non-relocated physical marking surface using the wand according to an embodiment.

Referring now to FIG. 14, wand 12 is used to create physical marking 96 on physical marking surface 94. The motion of wand 12 traces a path across virtual plane 88. This path is tracked and cloned as a digital image representative of marking 96. The new electronic page associated with virtual plane 88 is updated to include that digital image and is displayed on projection screen 30.

Figure 15:
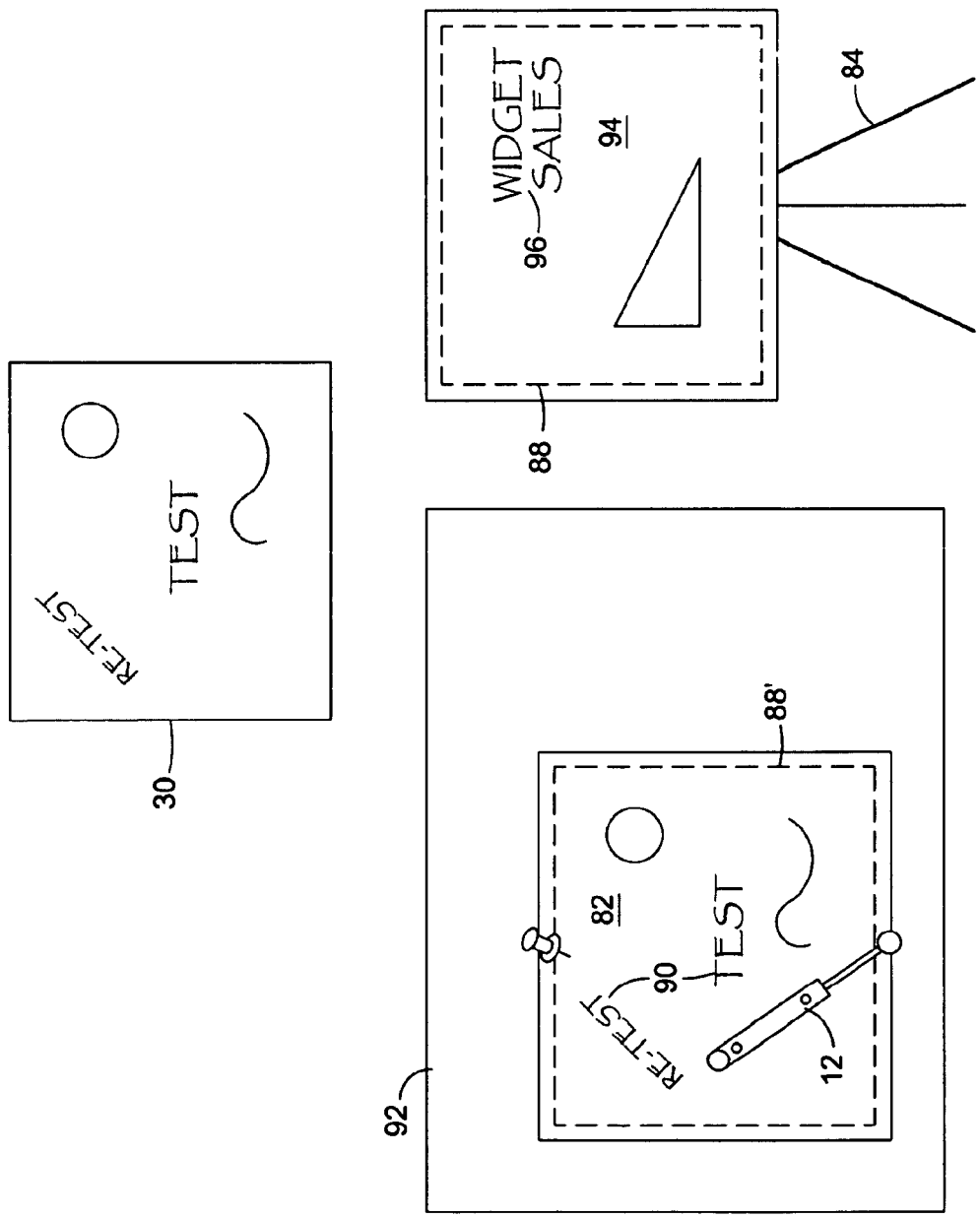
FIG. 15 is a schematic diagram illustrating the relocated physical marking surface being updated with additional text and graphics drawn using the wand according to an embodiment.

Referring to FIG. 15, relocated virtual plane 88' is set to active resulting in the display of the electronic page associated with relocated virtual plane 88' on projection screen 30. Wand 12 is used to add to marking 90. In this case the word RE-TEST is drawn on marking surface 82 along with a squiggle line and a circle. The motion of wand 12 traces various paths across relocated virtual plane 88'. The paths are tracked and cloned as digital images representative of the updates to marking 90. The electronic page associated with relocated virtual plane 88' is updated to include those digital images and is displayed on projection screen 30.

Figure 16:
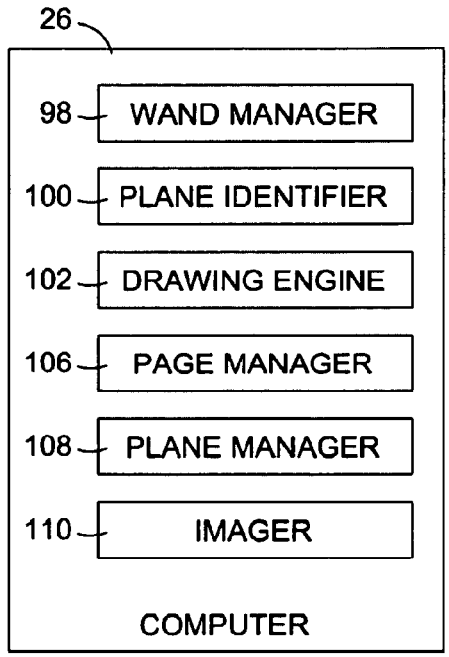
FIG. 16 is a block diagram illustrating exemplary physical and logical components configured to implement various embodiments.
Figure 17:
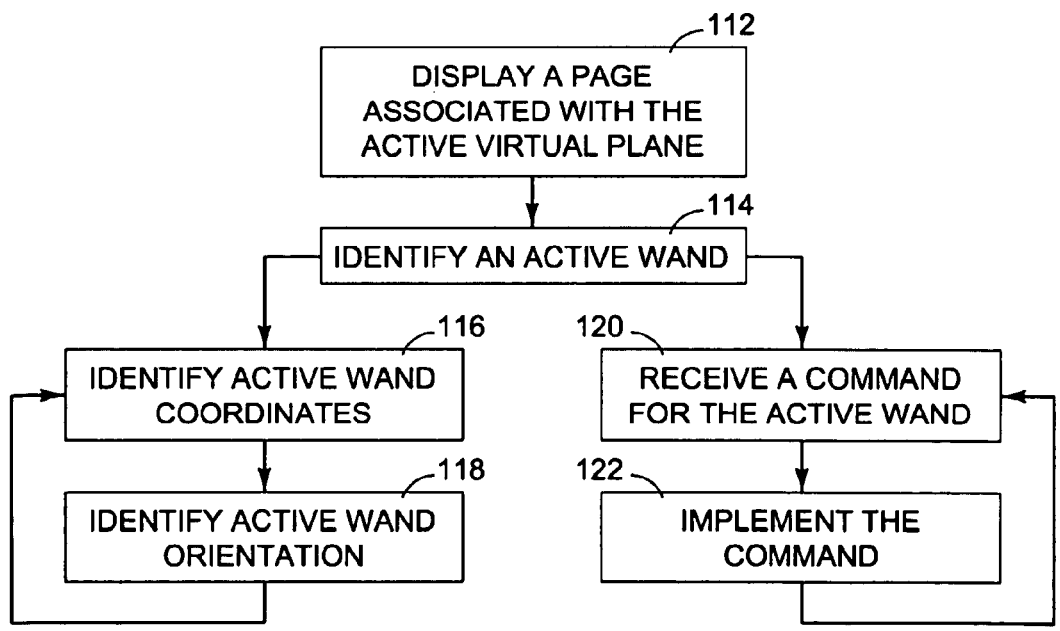
FIGS. 17-23 are exemplary flow diagrams illustrating steps taken to implement various embodiments.

Components: FIG. 16 is a block diagram illustrating exemplary physical and logical components configured to implement various embodiments. In FIG. 16, computer 26 is shown to include wand manager 98, plane identifier 100, drawing engine 102, page manager 106, plane manager 108, and imager 110.

Wand manager 98 represents generally any combination of hardware and programming configured to identify a position of a wand such as wand 12 within a presentation environment. With respect to FIGS. 1-3, wand manager 98 is responsible for communicating with positioners 14, 16, and 18 to determine a position and orientation of wand 12. Wand manager 98 is responsible for tracking motion of wand 12 to identify a path traced across an active virtual plane. For example, wand manager 98 is configured to detect when a marking end of wand 12 is proximate to a particular virtual plane. Wand manager 98 tracks the motion and orientation of wand with respect to that virtual plane to identify a path traced across the virtual plane. As discussed above, where wand 12 is used to draw an image on a marking surface, the traced path corresponds to the image drawn. Wand manager 98 is also responsible for identifying a user's activation of controls 24 and for initiating an associated action. As a non-exhaustive list, a user, for example, may activate a particular control 24 causing wand manager 28 to identify a corner of a virtual plane to be defined, to set a particular virtual plane to active, to associate a particular electronic page with a particular virtual plane, and to associate a particular color with wand 12.

Plane identifier 100 represents generally any combination of hardware and programming configured to define virtual planes within a presentation environment. As noted above, a user may sequentially position wand at various corners of a marking surface. At each corner, the user activates a control 24 causing wand manager 98 to identify and pass the coordinates of that corner to plane identifier. Once a sufficient number of coordinates have been received, plane identifier 100 defines a virtual plane corresponding to those coordinates. The virtual plane may be clipped so that its dimensions correspond to the dimensions of a marking surface.

Drawing engine 102 represents generally any combination of hardware and programming configured to communicate with wand manager 98 to track a motion of wand 12. The tracked motion, for example, may correspond to a use of wand 12 to draw a mark on a marking surface. Drawing engine 102 is responsible for identifying a path traced across an active virtual plane. The identified path corresponds to the tracked motion. In other words, the orientation of wand 12 defines a virtual line. The motion of wand 12 causes the intersection of the virtual line and the virtual plane to move tracing a path across the virtual plane. As mentioned above, a virtual plane is associated with a particular electronic page.

Drawing engine 102 is responsible for updating the electronic page associated with the active virtual plane to include a digital image representative of the traced path. The digital image is a clone of the mark drawn on the marking surface. In other words, as the wand is used to draw a mark on a marking surface, the motion of wand 12 is tracked to identify a corresponding path traced across a virtual plane. A digital image representative of that path is added to the electronic page associated with the virtual plane. If a user draws a circle, a digital image of a circle is added to the electronic page. It is also noted that drawing engine 102 positions the digital image on the electronic page so that it corresponds to a position of the mark drawn on the marking surface with respect to the virtual plane.

Page manager 106 represents generally any combination of hardware and programming configured to create new electronic pages and associate a selected electronic page with a selected virtual plane. Upon plane identifier 100 defining a virtual plane, page manager 106 generates and associates a new electronic page with that virtual plane. Typically a new electronic page is blank but it may include a watermark or other background image. Page manager 106 is also responsible for altering the associations between existing electronic pages and existing virtual planes.

For example, a user may be drawing on a marking surface such as a flip chart. Page manager 106 may have created an electronic page for each page in the flip-chart. Page manager 106 sorts those pages sequentially to match the order to the corresponding flip-chart pages. A user may desire to flip back and forth between pages of the flip chart. When flipping from one flip chart page to the next, the same virtual plane is in use. However, each flip chart page corresponds to a different one of the electronic pages. As noted above, wand manager 98 is responsible for identifying a user's activation of controls 24 and for initiating an associated action. In this case, upon flipping to a subsequent page on the flip chart, a user activates a designated control 24. Wand manager 98 detects the activation and instructs page manger 106 to associate a subsequent electronic page with that virtual plane. Likewise, upon flipping to a previous page on the flip chart, a user activates a designated control 24. Wand manager 98 detects the activation and instructs page manger 106 to associate a previous electronic page with that virtual plane.

Plane manager 108 represents generally any combination of hardware and programming configured to manage virtual planes defined by plane identifier 100. Plane manager 108 is responsible for identifying a particular virtual plane as being active. In performing its tasks, plane manager 108 communicates with wand manager 98. Where for example, a virtual plane has been defined for a dry-erase or chalk board, plane manger 108 determines when a user positions the wand 12 to draw on the board. Upon making the determination, plane manager sets the virtual plane to active so that the electronic page associated with the virtual plane can be updated with digital images corresponding to the user's drawings.

Imager 110 represents generally any combination of hardware and programming configured to provide for the display of an electronic page. The digital image may be projected on a screen, displayed on a monitor, and communicated over a network to be displayed at a remote presentation environment. In use, imager 110 provides for the display of the electronic page that is associated with the active virtual plane. It is expected that more than one virtual plane may be active at a given time. In such a case, imager 110 may provide for the windowed or tiled display of the electronic pages associated with the active virtual planes.

Operation: FIGS. 17-23 are exemplary flow diagrams illustrating steps for implementing various embodiments. Starting with FIG. 17, an electronic page associated with an active virtual plane is displayed (step 112). Referring to FIG. 16, imager 110 may be used to implement step 112. In this example, plane manager 108 will have set a particular virtual plane as active and page manager 106 would have associated that active virtual plane with a particular electronic page. Imager 110 then is responsible for providing to the display of that particular electronic page.

An active wand is identified (step 114). Continuing with the above example, step 114 may be implemented using wand manager 98. A user may cause wand 12 to transmit a "positioning" signal received by one or more of positioners 14, 16, or 18. This may be accomplished by powering wand 12 causing transmitters 20 and 22 to transmit signals.

Once an active wand is identified in step 114, the process splits into two threads. The first thread includes steps 116 and 118 while the second thread includes steps 120 and 122. With respect to the first thread, the relative coordinates of the active wand are identified (step 116). Assuming that the coordinates of opposite ends of the wand are identified and discernable from one another, the orientation of the wand is also identified (step 118). With respect to the second thread, a command is received for the active wand (step 120). That command is implemented (step 122). Implementation of the second thread can be dependent, at least in part, on the first thread. For example, a given command may be to clone a hand drawn image. The command to do so may be made by positioning the wand proximate to marking surface associated with a virtual plane. The command may be implemented, at least in part, in step 122 by tracking the position and orientation of the wand to identify a path traced across the virtual plane. Various examples of the second thread are expanded upon in FIGS. 18-21.

It is noted that in a number of examples, an electronic page associated with an active virtual plane is updated. In such cases step 112 involves refreshing the display to include updates made to the electronic page. Other examples involve setting a new or existing virtual plane to active. In these cases, step 112 involves identifying such changes and displaying the electronic page associated with the virtual plane deemed active at the moment.

Figure 18:
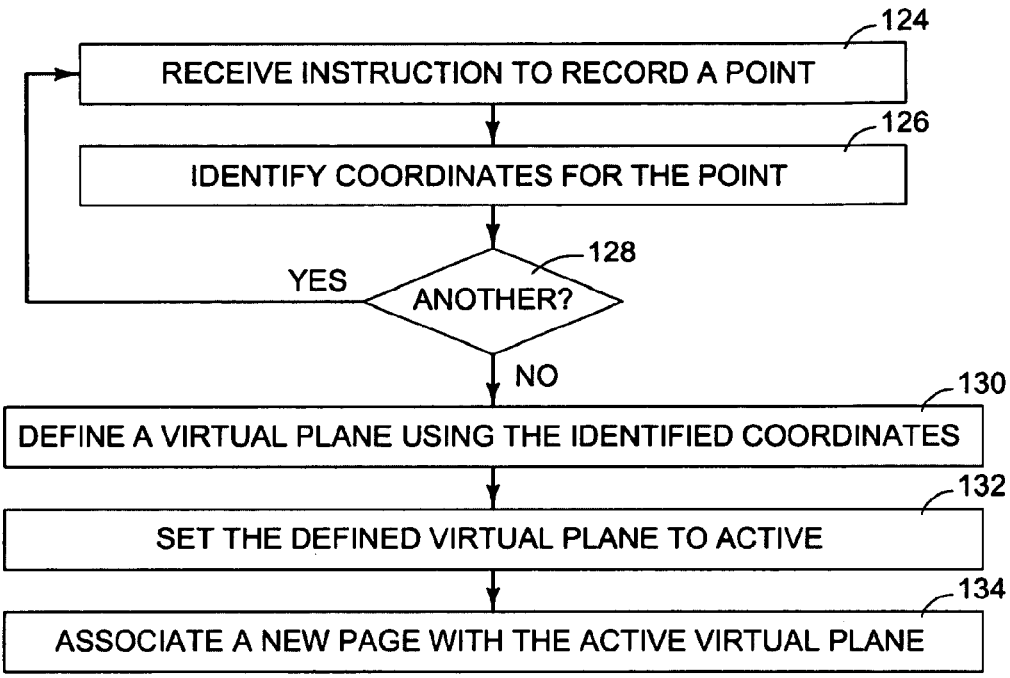

FIG. 18 is an exemplary flow diagram of steps taken to define a virtual plane. Instructions are received to record a user selected physical point in space within a presentation environment (step 124). The relative coordinates for that point within the environment are identified (step 126). It is determined if another point is to be identified (step 128). If so the process repeats with step 124. If not, a virtual plane is identified using the identified coordinates (step 130). Presumably, steps 124 and 126 will be repeated so that two or more coordinates are identified. The defined virtual plane is set to active (step 132), and a new electronic page is associated with the active virtual plane (step 134).

Referring back to FIG. 16, the method of FIG. 18 may, for example, be implemented using wand manager 98, plane identifier 100, page manager 106 and plane manager 108. Initially, a user positions wand 12 proximate to a particular point. That point, for example, may be a corner of a marking surface. Wand manager 98 recognizes when the user activates a control 24 and passes the current coordinates of wand (identified in step 116 of FIG. 17) to plane identifier 100. The process is repeated until a sufficient number of coordinates are identified allowing plane identifier to define a virtual plane in step 130. Plane manager 108 sets the defined virtual plane to active and page manager 106 associates a new page with the active virtual plane.

Figure 19:
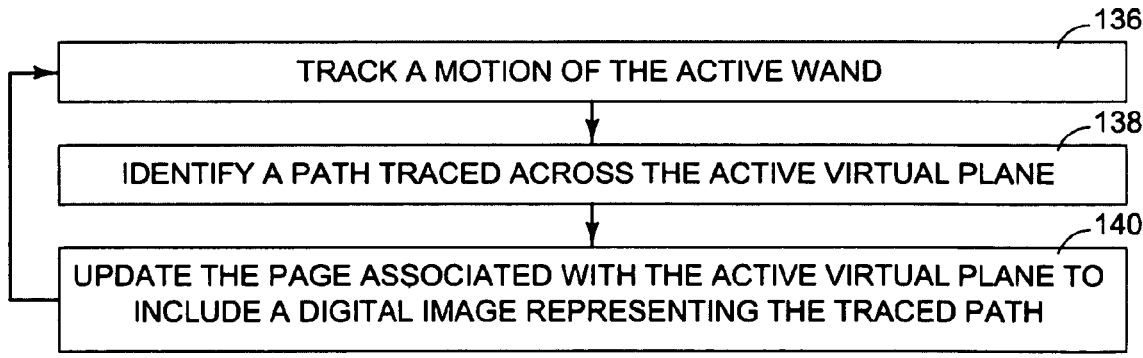

FIG. 19 is an exemplary flow diagram of steps taken to clone a hand drawn image. A motion corresponding to a change in position and/or orientation of an active wand is tracked (step 136). A path traced across an active virtual plane is identified—the path is defined by the tracked motion of the wand (step 138). Remember, the orientation of the wand defines a line. When the wand is pointed at the virtual plane, that line intersects the virtual plane. The motion of the wand causes the point of intersection to trace a path across the virtual plane. An electronic page associated with the active virtual plane is updated to include a digital image representative of the traced path (step 140). The path traced may correspond to the use of the wand to draw an image on a marking surface. In such a case, the digital image added to the electronic page is a clone of the hand drawn image.

Referring back to FIG. 16, the method of FIG. 19 may, for example, be implemented using wand manager 98 and drawing engine 102. Initially, a user. positions wand 12 proximate to a marking surface associated with a virtual plane. Drawing engine 102 communicates with wand manager 98 to track the motion of wand 12 with respect to the virtual plane. Drawing engine 102 identifies a path traced across the virtual plane. The identified path corresponds to the tracked motion. Drawing engine 102 then updates the electronic page associated with the virtual plane to include a digital image representative of the traced path.

Figure 20:
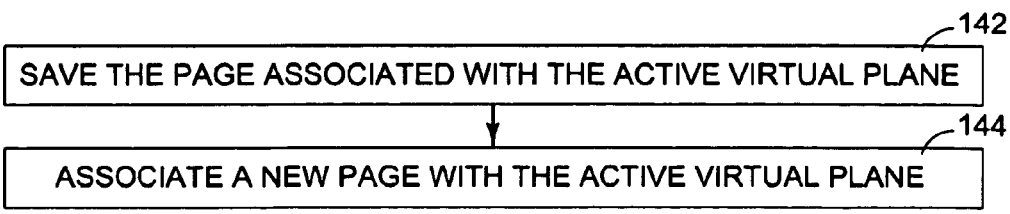

FIG. 20 is an exemplary flow diagram illustrating steps taken when a user desires to associate a new electronic page with a virtual plane. For example a user may be using the wand to mark on a flip chart. The user has finished marking on one page of the flip chart and is now ready to begin marking on a subsequent page. The current page associated with the virtual plane is saved (step 142). A new electronic page is then associated with the virtual plane (step 144). Referring back to FIG. 16, the method of FIG. 20 may, for example, be implemented using wand manager 98 and page manager 106. Wand manager 98 recognizes when the user activates a designated control 24 and causes page manager to save the current page associated with the active virtual plane and associate a new electronic page with that virtual plane.

Figure 21:
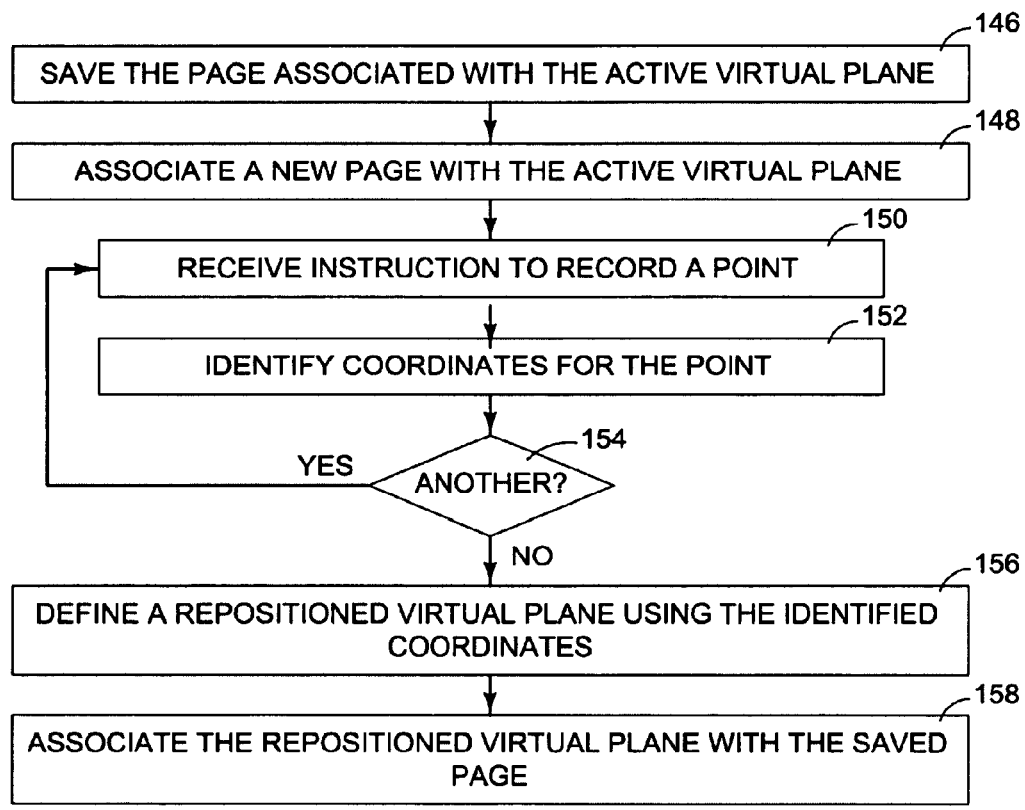

FIG. 21 is an exemplary flow diagram illustrating steps taken to define a relocated virtual plane. For example, a users drawing on a page of a flip chart may have been cloned according to FIG. 18. The user may then remove the exposed page from the flip chart and attach it to a wall or other surface. The existing virtual page associated with the flip chart still exists. To clone additional markings drawn on the relocated flip chart page, a relocated virtual plane is defined. The relocated virtual plane corresponds to the plane occupied by the relocated flip chart page.

Initially, the electronic page associated with the active virtual plane is saved (step 146). A new electronic page is associated with the active virtual plane (step 148). Instructions are received to record a point in space within the presentation environment (step 150). The relative coordinates for that point within the environment are identified (step 152). It is determined if another point is to be identified (step 154). If so the process repeats with step 150. If not, a relocated virtual plane is identified using the identified coordinates (step 156). The relocated virtual plane is associated with the saved page (step 158).

Referring back to FIG. 16, the method of FIG. 21 may, for example, be implemented using wand manager 98, plane identifier 100, page manager 106 and plane manager 108.

Initially, wand manager 98 recognizes when the user activates a designated control 24 and causes page manager to save the current page associated with the active virtual plane and associate a new electronic page with that virtual plane. Assumedly, the user has relocated a marking surface such as a flip chart page within the presentation environment. The user positions wand 12 proximate to a particular point. That point, for example, may be a corner of the relocated marking surface. Wand manager 98 recognizes when the user activates a control 24 and passes the current coordinates of wand (identified in step 116 of FIG. 17) to plane identifier 100. The process is repeated until a sufficient number of coordinates are identified allowing plane identifier to define a relocated virtual plane in step 156. Page manager 106 associates the electronic page saved in step 146 with the relocated virtual plane.

Figures 22, 23:
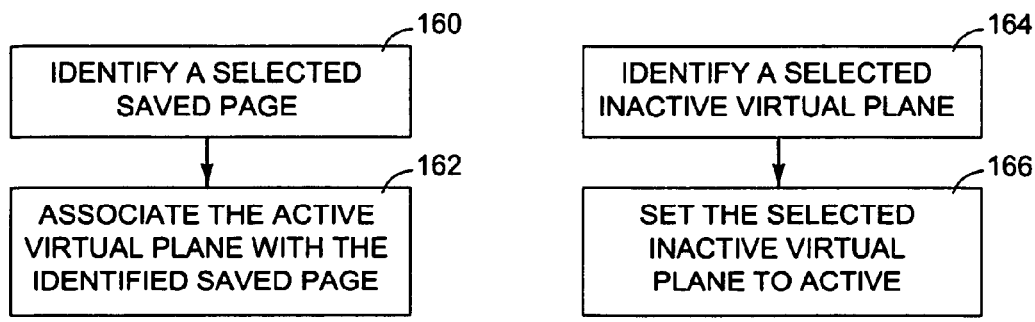

FIG. 22 is an exemplary flow diagram illustrating steps taken when a user desires to associate a previously saved page with an active virtual plane. For example a user may be using wand 12 to mark on a flip chart. The user has finished marking on one page of the flip chart and is now ready to once again mark on a previous page. A selected saved electronic page is identified (step 160). The identified saved page is then associated with the active virtual plane (step 162). While not shown, prior to step 162, the electronic page currently associated with the active virtual plane may be saved for later use. Referring back to FIG. 16, the method of FIG. 22 may, for example, be implemented using wand manager 98 and page manager 106. Wand manager 98 recognizes when the user activates a designated control 24 and causes page manager 106 to identify and associate a selected saved electronic page with the active virtual plane.

FIG. 23 is an exemplary flow diagram illustrating steps taken when a user desires to switch from one virtual plane to another. For example a user may be using wand 12 to mark on a flip chart. The user may desire to move and mark on a dry-erase board. At this point it is presumed that a different virtual plane has been associated with each of the marking surfaces. A selected inactive virtual plane is identified (step 164). The selected inactive virtual plane is set to active (step 166). Referring back to FIG. 16, the method of FIG. 23 may, for example, be implemented using wand manager 98 and plane manager 108. Initially, a user positions wand 12 proximate to or pointed at a marking surface associated with the inactive virtual plane. Plane manager 108, communicating with Drawing engine 102 identifies the position and or orientation of wand 12 and sets the inactive virtual plane to active.

Conclusion: The environments 10, 32, and 34 shown in FIGS. 1-3 are exemplary environments in which embodiments of the present invention may be implemented. Implementation, however, is not limited to these environments. FIGS. 6-9 illustrate examples of wands that can incorporate a physical marking device such as dry erase marker or chalk. However, implementation is not limited to these examples.

The diagrams of FIG. 16 show the architecture, functionality, and operation of various embodiments. Various components illustrated in FIG. 16 are defined at least in part as programs. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIGS. 17-23 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method for cloning hand drawn images comprising:
   identifying, within an environment, a position of a wand with respect to each of a first plurality of user selected physical points;
   defining a first virtual plane identified by the first plurality of points, the first virtual plane corresponding to a first marking surface;
   associating a first electronic page with the first virtual plane;
   tracking a first motion of the wand, the first motion corresponding to a use of the wand to draw a first mark on the first marking surface;
   identifying a first path traced across the first virtual plane, the first path defined by the tracked first motion; and
   updating the first electronic page to include a first digital image representative of the first path, the first digital image being a clone of the first mark.

2. The method of claim 1, further comprising:
   associating a second electronic page with the first virtual plane;
   tracking a second motion of the wand, the second motion corresponding to a use of the wand to draw a second mark on the first marking surface;
   identifying a second path traced across the first virtual plane, the second path defined by the tracked second motion; and
   updating the second electronic page to include a second digital image representative of the second path, the second digital image being a clone of the second mark.

3. The method of claim 2, further comprising providing for a display of the first and second electronic pages at the user's selection.

4. The method of claim 1, further comprising:
   identifying, within the environment, a position of the wand with respect to each of a second plurality of user selected physical points, the second plurality of physical points being different than the first plurality of physical points;

defining a second virtual plane identified by the second plurality of points, the second virtual plane corresponding to a second marking surface;

associating a second electronic page with the second virtual plane;

tracking a second motion of the wand, the second motion corresponding to a use of the wand to draw a second mark on the second marking surface;

identifying a second path traced across the second virtual plane, the second path defined by the tracked second motion; and updating the second electronic page to include a second digital image representative of the second path, the second digital image being a clone of the second mark.

5. The method of claim 4, further comprising, providing for a display of the first and second electronic pages at the user's selection.

6. The method of claim 1, wherein the first marking surface has been relocated within the environment, the method further comprising:

identifying, within the environment, a position of the wand with respect to each of a second plurality of user selected physical points, the second plurality of physical points being different than the first plurality of physical points;

defining a second virtual plane identified by the second plurality of points, the second virtual plane corresponding to the relocated first marking surface, and;

associating the first electronic page with the second virtual plane.

7. The method of claim 6, further comprising tracking a second motion of the wand, the second motion corresponding to a use of the wand to draw a second mark on the first marking surface;

identifying a second path traced across the second virtual plane, the second path defined by the tracked second motion; and updating the first electronic page to include a second digital image representative of the second path, the second digital image being a clone of the second mark.

8. A computer readable medium having computer executable instructions for:

identifying, within an environment, a position of a wand with respect to each of a first plurality of user selected physical points;

defining a first virtual plane identified by the first plurality of points, the first virtual plane corresponding to a first marking surface;

associating a first electronic page with the first virtual plane;

tracking a first motion of the wand, the first motion corresponding to a use of the wand to draw a first mark on the first marking surface;

identifying a first path traced across the first virtual plane, the first path defined by the tracked first motion; and updating the first electronic page to include a first digital image representative of the first path, the first digital image being a clone of the first mark.

9. The medium of claim 8, having computer executable instructions for:

associating a second electronic page with the first virtual plane;

tracking a second motion of the wand, the second motion corresponding to a use of the wand to draw a second mark on the first marking surface;

identifying a second path traced across the first virtual plane, the second path defined by the tracked second motion; and updating the second electronic page to include a second digital image representative of the second path, the second digital image being a clone of the second mark.

10. The medium of claim 9, having computer executable instructions for providing for a display of the first and second electronic pages at the user's selection.

11. The medium of claim 8, having computer executable instructions for:

identifying, within the environment, a position of the wand with respect to each of a second plurality of user selected physical points, the second plurality of physical points being different than the first plurality of physical points;

defining a second virtual plane identified by the second plurality of points, the second virtual plane corresponding to a second marking surface;

associating a second electronic page with the second virtual plane;

tracking a second motion of the wand, the second motion corresponding to a use of the wand to draw a second mark on the second marking surface;

identifying a second path traced across the second virtual plane, the second path defined by the tracked second motion; and updating the second electronic page to include a second digital image representative of the second path, the second digital image being a clone of the second mark.

12. The medium of claim 11, having computer executable instructions for providing for a display of the first and second electronic pages at the user's selection.

13. The medium of claim 8, wherein the first marking surface has been relocated within the environment, the medium having computer executable instructions for:

identifying, within the environment, a position of the wand with respect to each of a second plurality of user selected physical points, the second plurality of physical points being different than the first plurality of physical points;

defining a second virtual plane identified by the second plurality of points, the second virtual plane corresponding to the relocated first marking surface, and;

associating the first electronic page with the second virtual plane.

14. The medium of claim 13, having computer executable instructions for:

tracking a second motion of the wand, the second motion corresponding to a use of the wand to draw a second mark on the first marking surface;

identifying a second path traced across the second virtual plane, the second path defined by the tracked second motion; and updating the first electronic page to include a second digital image representative of the second path, the second digital image being a clone of the second mark.

15. A system for cloning hand drawn images comprising:

a wand manager operable to identify, within an environment, a position and motion of a wand;

with respect to each of a first plurality of user selected physical points;

a plane identifier operable to communicate with the wand manager to identify a position of the wand with respect to each of a first plurality of user selected physical points and to define a first virtual plane identified by the first plurality of points, the first virtual plane corresponding to a first marking surface;

a electronic page manager operable to associate a first electronic page with the first virtual plane;

a drawing engine operable to:

communicate with the wand manager to track a first motion of the wand, the first motion corresponding to a use of the wand to draw a first mark on the first marking surface, identify a first path traced across the first virtual plane, the first path defined by the tracked first motion; and update the first electronic page to include a first digital image representative of the first path, the first digital image being a clone of the first mark.

16. The system of claim 15, wherein:

the electronic page manager is operable to associate a second electronic page with the first virtual plane; and the drawing engine is operable to:

communicate with the wand manager to track a second motion of the wand, the second motion corresponding to a use of the wand to draw a second mark on the first marking surface;

identify a second path traced across the first virtual plane, the second path defined by the tracked second motion; and update the second electronic page to include a second digital image representative of the second path, the second digital image being a clone of the second mark.

17. The system of claim 16, further comprising an imager operable to provide for a display of the first and second electronic pages at the user's selection.

18. The system of claim 15, wherein:

the plane identifier is operable to communicate with the wand manager to identify, within the environment, a position of the wand with respect to each of a second plurality of user selected physical points, the second plurality of physical points being different than the first plurality of physical points, the plane identifier being operable to define a second virtual plane identified by the second plurality of points, the second virtual plane corresponding to a second marking surface;

the electronic page manager is operable to associate a second electronic page with the second virtual plane; and the drawing engine is operable to:

communicate with the wand manager to track a second motion of the wand, the second motion corresponding to a use of the wand to draw a second mark on the second marking surface;

identify a second path traced across the second virtual plane, the second path defined by the tracked second motion; and update the second electronic page to include a second digital image representative of the second path, the second digital image being a clone of the second mark.

19. The system of claim 18, further comprising an imager operable to provide for a display of the first and second electronic pages at the user's selection.

20. The system of claim 15, wherein the first marking surface has been relocated within the environment, and wherein:

the plane manager is operable to communicate with the wand manager to identify, within the environment, a position of the wand with respect to each of a second plurality of user selected physical points, the second plurality of physical points being different than the first plurality of physical points, the plane manager being operable to define a second virtual plane identified by the second plurality of points, the second virtual plane corresponding to the relocated first marking surface, and;

the electronic page manager is operable to associate the first electronic page with the second virtual plane.

21. The system of claim 20, wherein the drawing engine is operable to:

communicate with the wand manager to track a second motion of the wand, the second motion corresponding to a use of the wand to draw a second mark on the first marking surface;

identify a second path traced across the second virtual plane, the second path defined by the tracked second motion; and update the first electronic page to include a second digital image representative of the second path, the second digital image being a clone of the second mark.

* * * * *